United States Patent
Daniels et al.

(10) Patent No.: US 6,934,852 B2
(45) Date of Patent: Aug. 23, 2005

(54) SECURITY KEYS FOR ENHANCED DOWNSTREAM ACCESS SECURITY FOR ELECTRONIC FILE SYSTEMS AND DRIVES

(75) Inventors: Scott Leonard Daniels, Cedar Park, TX (US); Danny Marvin Neal, Round Rock, TX (US); Yat Hung Ng, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 844 days.

(21) Appl. No.: 09/732,810

(22) Filed: Dec. 11, 2000

(65) Prior Publication Data

US 2002/0073328 A1 Jun. 13, 2002

(51) Int. Cl.⁷ .......................... G06F 11/30; G06F 12/14; H04L 9/00; H04L 9/32
(52) U.S. Cl. .................. 713/200; 380/22; 713/201; 713/202; 710/74; 711/164; 711/173
(58) Field of Search ......................... 711/164, 173, 711/100; 710/74; 713/200–202, 161, 164–167, 193; 380/22

(56) References Cited

U.S. PATENT DOCUMENTS

| | | | | |
|---|---|---|---|---|
| 5,265,208 A | * | 11/1993 | Moore et al. ................. | 710/74 |
| 5,430,827 A | * | 7/1995 | Rissanen .................... | 704/272 |
| 5,550,968 A | * | 8/1996 | Miller et al. ................ | 345/741 |
| 5,727,146 A | * | 3/1998 | Savoldi et al. .............. | 713/201 |
| 5,774,551 A | * | 6/1998 | Wu et al. .................... | 713/155 |
| 6,219,771 B1 | * | 4/2001 | Kikuchi et al. ............. | 711/164 |
| 6,336,187 B1 | * | 1/2002 | Kern et al. .................. | 713/161 |
| 6,526,512 B1 | * | 2/2003 | Siefert et al. ............... | 713/200 |

* cited by examiner

*Primary Examiner*—Avaz Sheikh
*Assistant Examiner*—Longbit Chai
(74) *Attorney, Agent, or Firm*—Mark E. McBurney; Dillon & Yudell LLP

(57) ABSTRACT

A method and system for protecting electronic files from unauthorized access. The drive on which the file is stored is provided with a hardware identification code, which is unique to the drive. An Operating System (OS) extension allows a user to provide a security code required to access a requested drive. OS device driver, working in conjunction with the extension of the OS checks the requested drive to determine if an access code is required, and the drive responds with the security code or a default code. The default code indicates that the drive is globally accessible to users on the system. When a security code is returned, the OS compares the security code to the access code provided and provides the user with access to the drive only when the access code matches the security code.

12 Claims, 3 Drawing Sheets

SECURITY KEYS FOR ENHANCED DOWNSTREAM ACCESS SECURITY FOR ELECTRONIC FILE SYSTEMS AND DRIVES

BACKGROUND OF THE INVENTION

1. Technical Field

The present invention relates in general to computer systems and, in particular, to electronic files on computer systems. Still more particularly, the present invention relates to a method of providing security to electronic files on a multiple-user accessible computer system.

2. Description of the Related Art

Electronic files are often stored on a computer system that is accessible to multiple users. The users may be local users or remote users, who access the computer system from across a network. Typical networks range from smaller and geographically compact local area networks (LAN) to larger and geographically distributed Wide Area Networks (WAN) such as the Internet.

In a networked computer system environment, there is occasionally a need or desire to protect particular electronic files from access by general users. That is, limited access to a particular file is provided to specific system users who are authorized to access the particular file, while no access is provided to other users authorized to be on the system but not authorized to access the particular file.

Presently, file access protection is handled at the Operating System (OS) level. The OS authorizes file access capability for various types of users by one of several OS specific software-based methods known in the art. UNIX, for example provides file access protection via the "chmod" command, which allows a user or system administrator to establish Read/Write/Execute file privileges for individual users or groups of users at the OS level.

The use of OS level protections, however, have proven to be susceptible (i.e., vulnerable) to being compromised by hackers, making the OS level protection less desirable for sensitive files. Also, due to reliance on a system administrator, lapses, which occasionally occur in system administration result in corresponding lapses in security of user's password and file authorization.

In some instances, very sensitive files are stored on a separate, external, hard drive, which is connected to the computer system during use. To prevent unauthorized access of the hard drive, owners of the hard drives often completely remove their hard drives when the files are not in use. The owner may then store the hard drive in a secure place. Such a process is inefficient and does not provide universal protection for drives which are internal drives that cannot be easily removed or for the period of time when such drive is installed in the system. Also, if an unauthorized user gains physical access to the hard drive that has been removed, the unauthorized user merely has to connect the drive to a computer system to gain access to the files stored on the hard drive. Similar concepts apply to other mass storage media, such as CDs/DVDs and tapes.

The present invention recognizes the need for providing a security mechanism beyond the level of standard OS protections for electronic files stored on a security-sensitive drive. A system in which a security-sensitive drive is resistant to hacking and other forms of unauthorized access would be a welcomed improvement. These and other benefits are provided in the present invention.

SUMMARY OF THE INVENTION

Disclosed is a method and system for protecting electronic files from unauthorized access. The drive(s) on which the file is stored is provided with a hardware identification code, which is unique to the drive and known only by a user to whom access to the files stored on the drive is authorized. An Operating System (OS) extension could be easily developed. The OS extension allows a user to provide a security code required to access a requested drive whenever a job is initiated. Each process spawned by the job inherits this security code. Wherever any of the process access a hard drive, that hard drive responds with a security code or a default code. The default code indicates that no user-provided access code is required, and the drive is globally accessible to users on the system. Thus, when the default code is returned by the drive, automatic access to the drive is provided. When a security code is returned from the drive, the OS compares the security code to the access code provided by the user and provides the user with access to the drive only when the access code matches the security code.

When the access code does not match the security code, the security extension of the OS terminates (kills) the process that failed the authentication and also other processes spawned by the same job, thereby canceling the job. The potential of hacking into secure drives, by guessing the security code is substantially eliminated.

In one embodiment, the security code may also be stored (as a header) on the media itself. The embodiment thus extends protections not only to hard drives but also to CDs, DVDs, and tapes.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method and system for enabling a drive-level security key for enhanced security of electronic files or file systems on a multiple-user or networked computer system. With reference now to the figures and in particular with reference to FIG. 1, there is illustrated a data processing system with which a preferred embodiment of the invention may be implemented.

Figure 2:
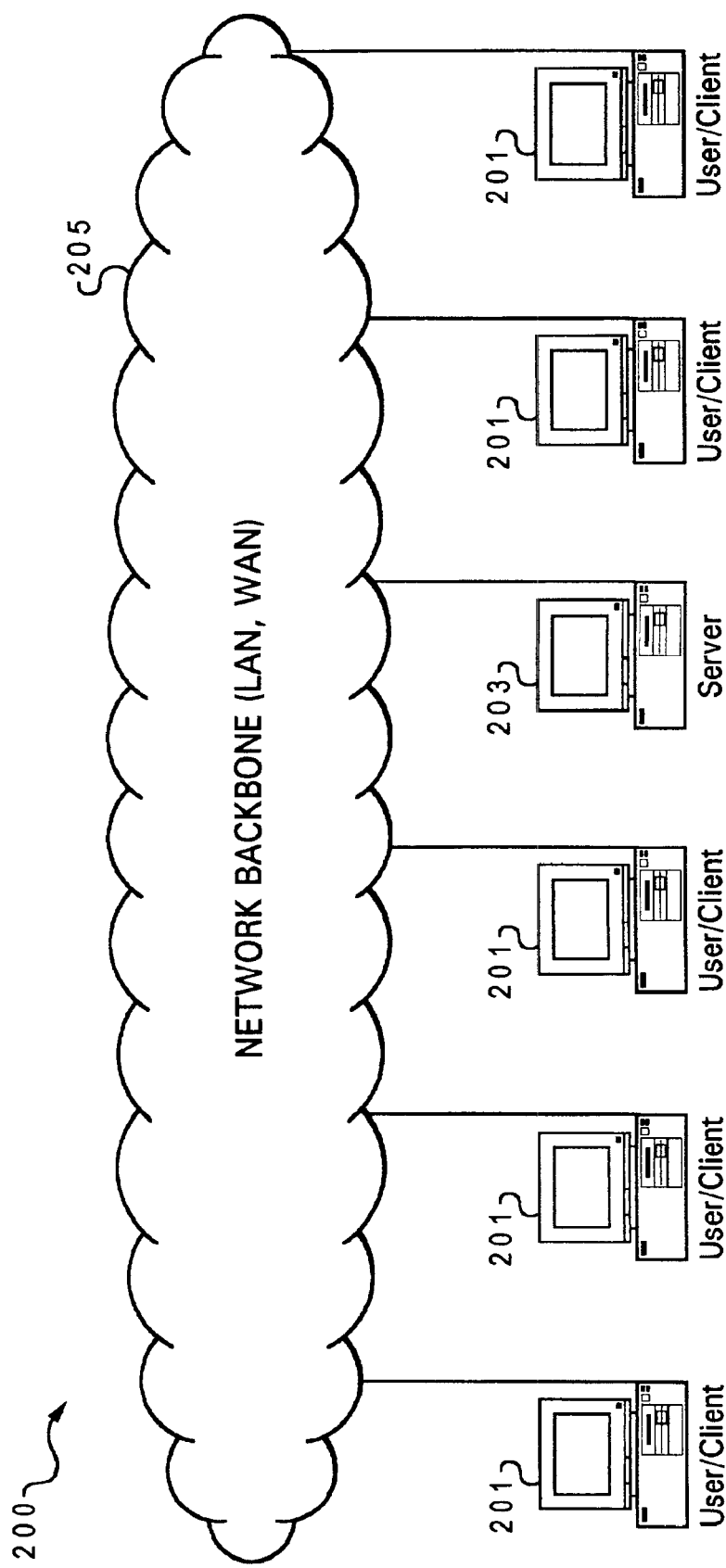
FIG. 2 illustrates a multiple-user (or networked) computer system within which the method of the present invention may advantageously be utilized.

Data processing system 100 may be utilized as a stand-alone computer system or one of several clients and/or servers in a network as provided in FIG. 2. Data processing system 100 has at least one processor 10, which is connected to several peripheral devices including input/output (I/O) devices 114 (e.g., display drive, keyboard, and graphical pointing device) for user interface and a system memory 118 such as random access memory (RAM) that is utilized by processor 10 in execution of current program instructions. Peripheral devices also include a mass storage device 116 (such as a hard disk), which hosts the data processing system's operating system (OS) 115 and applications (not illustrated). As illustrated, in the preferred embodiment, OS 115 includes an OS extension utilized to carry out several of the features of the present invention.

Figure 1:
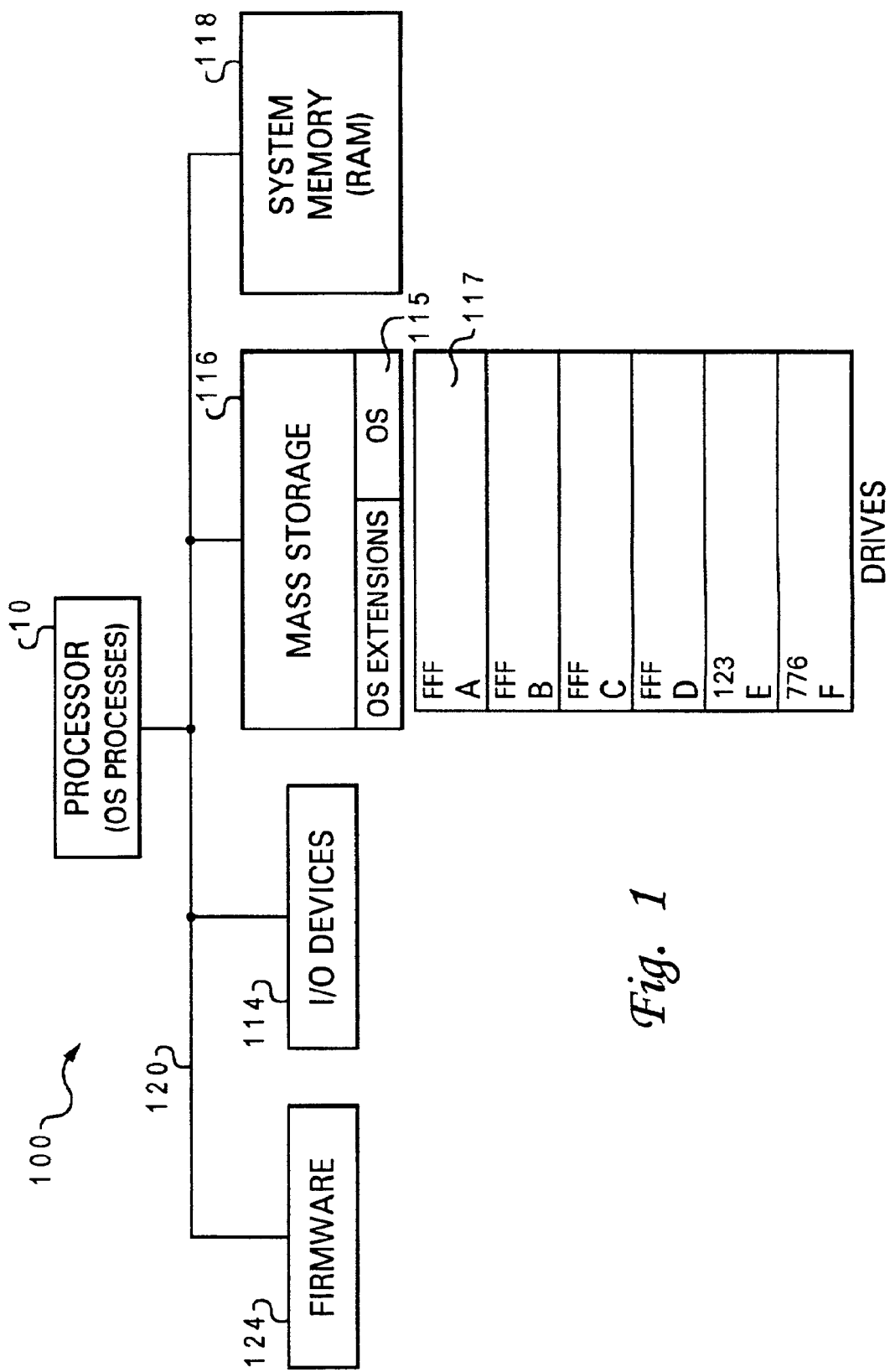
FIG. 1 depicts an illustrative embodiment of a data processing system with which the method and system of the present invention may be implemented.

Those skilled in the art will further appreciate that there are other components that might be utilized in conjunction with those shown in the block diagram of FIG. 1; for example, a display adapter connected to processor 10 might be utilized to control a video display monitor, and a memory controller may be utilized as an interface between system memory 118 and processor 10. Data processing system 100 also includes firmware 124 whose primary purposes are to configure the system and to seek out and load an operating system from one of the peripherals (usually mass storage of device 116) whenever data processing system 100 is powered up.

In the preferred embodiment, mass storage device 116 also comprises a plurality of other drives 117, which hosts application code and data. The other drives 117 system may contain a series of logical drives or separate physical drives connected to data processing system 100. Mass storage device 116 is preferably a logical drive (e.g., drive C) and may house one or more of the other drives 117 illustrated. Additionally, the other drives 117 may also contain removable storage media such as CD, DVD, and tapes as part of mass storage device 116. Permanent memory device 116 has a security code value FFF in the preferred embodiment. As illustrated, other drives 117 include drives A–F, each of which is separately accessible via an OS drive-access process executed by processor 10. Each drive has a corresponding microcode, stored in a Flash EPROM on the drive itself, among control logic of the drive. The microcode operates with the OS device driver to allow access to the drive. In the illustrated embodiment, drives A–D also contain a default value security code (FFF), while drives E and Figure contain access security codes. Use of these security codes will become clearer in the description below.

Coupled to processor 10 may be various external devices, such as, for example, a modem and/or network adapter, utilized for connecting data processing system 100 to other systems and/or networks, as is illustrated in FIG. 2.

FIG. 2 depicts a multiple-user or networked computer system. Networked computer system 200 comprises several user/client systems 201, which may be similarly configured to server 203 both of which may be a data processing system 100. One server 203 hosting the drive system for file storage is illustrated, although as previously stated each user/client system 201 may be similarly configured. Modern servers 203 can host a very large number of drives. User/client systems 201 and server 203 are interconnected by a network backbone 205. User/client systems 201 provide users with access to the drives, storage devices, or file systems (all collectively referred to hereafter as drives) of server 203. Network backbone 205 is a generic representation of a network, including both LANs and WANs. The invention is applicable to all types of networks or multiple-user computer systems.

As utilized herein, a multiple-user computer system refers to both a single computer system that may be accessed by multiple users and a distributed computer system with a number of terminals that provide user access. Also, accessing the drives refers to both read and write operations. Protection provided against unauthorized write operations ensures that sensitive files are not altered or corrupted. The present invention provides a method and system for protecting an electronic file that is stored on server 203 that may provide general access to users either locally or via networked computer system 200. The invention provides a hardware-based lock on a specific drive to restrict unauthorized access to files stored on such drives.

In the preferred embodiment, security code is provided for the drive on which the file is stored and utilized by the owner or authorized user of the electronic file to access the drive. Providing the drive with the security code is completed when the drive is first connected to the computer system and set up by the system administrator. In the preferred implementation, the hardware-based level of file protection is provided in addition to the standard software-based (i.e., OS) level. Thus, the present invention offers an additional level of protection for files requiring security, but only introduces minimal changes to the standard OS and/or hardware environment.

In the preferred embodiment, a unique, drive-level (i.e., not OS or application level) security code is assigned to the drive as part of the drive's internal microcode. The drive's internal microcode is updated during system administration, and the owner of the drive assigns or sets up the security code on the drive. The drive is prevented from being read at a system level by anyone during system administration procedures in order to discretely set up the authentication microcode. Assignment of the security code results in a cypher-lock type protection for the drive.

The hardware-level, or drive-level protection of the present invention is aimed primarily at multi-system clusters or file systems. Therefore, the method is preferably designed to be compatible with conventional system architectures and not just with certain specialized secure systems. Thus, the preferred embodiment of the invention applies equally well to heterogenous multi-system or multi-user environments.

In a preferred embodiment, since access of files from "protected" and from "ordinary" drives are inexplicably intermixed, as a part of normal way of executing software, the authentication process is performed by the operating system, whenever data needs to be transferred from a mass storage device (DASD/CDROM/Tape) to main memory, or even directly to the processor (PIO/MMIO). In other words, the authentication is not done in a hardware, by putting a "hardware lock" on a particular mass storage device. The authentication is completed at the level of individual processes, as the processes cause data to be moved in and out of mass storage devices. In the preferred embodiment, it is important that both, read and write operations against mass storage are protected. Protecting against unauthorized write operations will insure that sensitive files will not be altered/corrupted.

Figure 3:
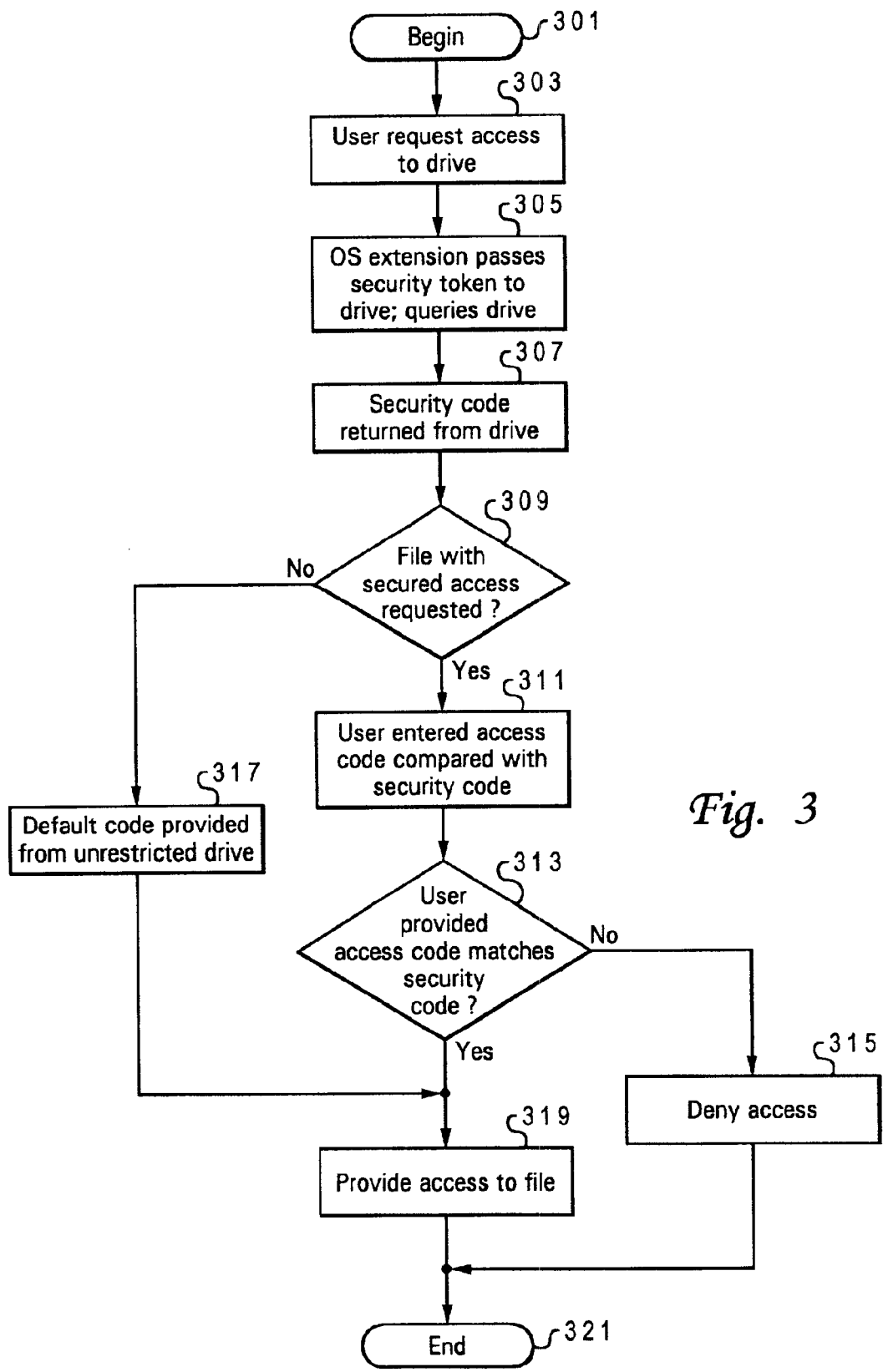
FIG. 3 is a flow diagram of the process of enabling a security key mechanism for an electronic file in accordance with a preferred embodiment of the invention.

Referring now to FIG. 3, there is illustrated a flowchart of one embodiment of the processing that occurs during file access authentication. The process begins at block 301 and then proceeds to block 303, where a user requests access (i.e., read or write) to a drive on the computer system. The OS extension queries the requested drive's microcode for a security code at block 305. The drive's microcode provides a security code to the OS extension at block 307. A drive's level of security access protection is determined by the value of the security code returned by the OS extension.

A determination is made whether the drive is protected (i.e., if a valid security code is returned) at block 309. If the drive has no encoded security protection, then the drive responds with a default security code as shown in block 317, and the OS extension interprets the default security code as indicating that access to the drive is not restricted and that the drive may be generally accessed as illustrated in block 315.

In one embodiment, the security code is stored as several particular bits in the drive's internal microcode. If the drive is not protected, the bits all default to a value of "F". When the OS extension returns all Fs from the drive, the OS interprets the Fs as an indiction that the drive is an un-restricted drive. Because of latency concerns, the authentication process of the present invention could be made to complete only once for each job. The OS extension tracks if a given drive has already been through the authentication process for a particular user (job) and thus prevents the authentication process from being done again for the same user during the same session.

During operation of the invention, an OS extension (via device driver) passes a security token to a drive when the address range of a requested file is allocated to a particular drive. The authentication process may be performed by either the CPU or a mass storage adapter (e.g., SCSI, etc.), or a combination of both. In the first instance (i.e., authentication performed by the CPU), the process may be completed primarily with the OS (the security extension and corresponding device driver). The second instance, however, requires modifications to the adapter microcode in addition to the modification required by the first instance.

Returning now to block 309 of FIG. 3, if a valid security code is returned by the OS extension process, the security code is compared with a user-entered access code at block 311. The access code is supplied by the user to the OS as a part of a job submission action and becomes inherited by each process that is spawned as a result of a job execution. The OS then determines, as illustrated in block 313, whether the access code supplied by the user matches the security code of the drive. If there is no match, the OS prevents access by the user to the particular drive and outputs an appropriate error message as shown in block 315 and kills this process and other processes spawned by the same job, thereby canceling that job. If there is a match, access to the drive is granted at block 319. The process then ends at block 321.

The invention may be implemented along with other software protection methods such as utilization of individual file passwords. Thus, requiring a hardware-level security code to access the drive may represent only one of several security utilized. The methods of the present invention may be implemented along with these software-level security measures.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable-type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for providing access protection to electronic storage devices, said method comprising the steps of providing a device-stored hardware-level security code for a storage device on which is stored an electronic file to which user access is restricted;

initializing said security code within said storage device during set-up of said storage device, wherein said security code is unique to said storage device and is required to complete all accesses to said storage device, including read accesses and write accesses, wherein said initializing includes:

blocking access to said storage device during said initializing; and placing said security code within pre-determined bits of a microcode of the storage device, wherein said predetermined bits are defaulted to a default value when no security code is placed therein;

providing within an operating system (OS) of a user computer an OS-extension that enables (1) retrieval of said security code from said storage device to said user computer system and (2) blocking access to said storage device by processes on said user computer system when a user-provided code does not match the security code retrieved from the storage device;

wherein the OS-extension enables use of the hardware-level security code within a localized, OS-level security checking process, wherein said hardware-level security code is loaded into the OS-level security checking process whenever a user process on the user computer system attempts a read or write operation on said storage device; and allowing access by said user process to said storage device from the user-computer system with the OS-extension only when the user-provided code is determined by the localized, OS-level security checking process to match said hardware-level security code.

2. The method of claim 1, wherein said storage device is one of multiple storage devices accessible via the OS and each of said multiple storage devices is configurable with a unique security code, said method further comprising:

determining to which one of said multiple storage devices access is being requested; and comparing the user-entered code against the particular security code associated with that one storage device, wherein access granted/denied to a first one of the multiple storage devices is independent of access granted/denied to a second one of said multiple storage devices, wherein further the security code of the first device is unique among security codes of the multiple available storage devices.

3. The method of claim 1, further comprising the step of:

receiving at the OS-level a process request for access to said storage device;

retrieving from the storage device the security code stored within microcode of the device and forwarding the security code to the localized, OS-level security checking process;

evaluating said security code retrieved for a pre-defined default value; and in response to said security code having a pre-defined default value, providing said user with unrestricted access to said storage device.

4. The method of claim 3, wherein when said security code does not have said pre-defined default value, said method further comprises:

comparing said security code with said user provided access code;

providing access when said security code matches said user-provided access code; and denying access when said security code does not match said user-provided access code.

5. The method of claim 3, further comprising:

providing process-based security checks for access to said storage device, wherein an access security check is initiated for each read/write access to said storage device by a different process executing on said local user computer system; and wherein each process associated with a single application initiated by the user is provided a same user-entered access code as a default and individual processes may be provided a hardware-specific access code for the particular storage device to which the process requests access.

6. The method of claim 5, further comprising the steps of:

restricting a subsequent request for access to said storage device by a user when said security code does not match said user access code during an initial comparison of the codes; and when the codes do not match, automatically terminating at least the process requesting access that was submitted by said user.

7. A computer program product comprising:

a computer readable medium; and program instructions stared an said computer readable medium for implementing file access protection by retrieving a locally-stored hardware-level security code for a remote storage device an which is stored an electronic file to which user access is restricted, wherein said security code is placed within said storage device during set-up of said storage device, wherein said security code is unique to said remote storage device and is required to complete all accesses to said storage device, including read accesses and write accesses;

providing within an operating system (OS) of a user computer an OS-extension that enables (1) retrieval of said security code from said storage device to said user computer system and (2) blocking access to said storage device by processes an said user computer system, when a user-provided code does not match the security code retrieved from, the storage device;

wherein the OS-extension enables use of the hardware-level security code within a localized, OS-level security checking process, wherein said hardware-level security code is loaded into the OS-level security checking process whenever a user process on the user computer system attempts a read or write operation on said remote storage device;

receiving at the OS-level a process request for access to said storage device;

retrieving from the storage device the security code stared within microcode of the device and forwarding the security code to the localized. OS-level security checking-Process; evaluating said security code retrieved for a pre-defined default value;

in response to said security code having a pre-defined default value, providing said user with unrestricted access to said storage device; and when the security code does not have the pre-defined default value, allowing access to said storage device only when the user-provided wade is determined by the local, OS-level security checking process to match said hardware-level security code.

8. The computer program product of claim 7, further comprising program instructions for initializing said security code within a microcode of said drive, wherein access to said drive is denied during said initializing step.

9. The computer program product of claim 7, wherein storage device is one of multiple storage devices accessible via the OS and each of said multiple storage devices is configurable with a unique security code, said program product further comprising program instructions for:

determining to which one of said multiple storage devices access is being requested; and comparing the user-entered code against the particular security code associated with that one storage device, wherein access granted/denied to a first one of the multiple storage devices is independent of access granted/denied to a second one of said multiple storage devices, wherein further the security code of the first device is unique among security codes of the multiple available storage devices.

10. The computer program product of claim 7, wherein, when said security code does not have said pre-defined default value, said program product further comprises program instructions for: comparing said security code with said user-provided code; providing access when said security code matches said user-provided access code; and denying access when said security code does not match said user-provided access code.

11. The computer program product of claim 7, further comprising program instructions for:

providing process-based security checks for access to said storage device, wherein an access security check is initiated for each read/write access to said storage device by a different process executing on said local user computer system; and wherein each process associated with a single application initiated by the user is provided a same user-entered access code as a default and individual processes may be provided a hardware-specific access code for the particular storage device to which the process requests access.

12. The computer program product of claim 11, further comprising program instructions for:

restricting a subsequent request for access to said storage device by a user when said security code does not match said user access code during an initial comparison of the codes; and when the codes do not match, automatically terminating at least the process requesting access that was submitted by said user.

* * * * *